United States Patent [19]

Amanuma et al.

[11] Patent Number: 5,565,940
[45] Date of Patent: Oct. 15, 1996

[54] CAMERA WITH VIBRATION CORRECTING FUNCTION

[75] Inventors: Tatsuo Amanuma, Ageo; Toshiyuki Nakamura, Tokyo; Hidenori Miyamoto, Urayasu, all of Japan

[73] Assignee: Nikon Corporation, Tokyo, Japan

[21] Appl. No.: 377,274

[22] Filed: Jan. 23, 1995

[30] Foreign Application Priority Data

Apr. 27, 1994 [JP] Japan .................................. 6-090327

[51] Int. Cl.⁶ ............................ G03B 5/00; G03B 15/05
[52] U.S. Cl. ............................................. 396/55; 396/157
[58] Field of Search .................................. 354/430, 202, 354/127.1, 418, 127.11, 127.12

[56] References Cited

U.S. PATENT DOCUMENTS

5,153,633 10/1992 Otani ........................ 354/430
5,192,964 3/1993 Shinohara et al. ................ 354/202

*Primary Examiner*—W. B. Perkey

[57] ABSTRACT

A camera with a vibration correcting function, having a phototaking preparation start device releasing a preparatory operation start signal for instructing the start of a phototaking preparatory operation by a first manual operation, a vibration state detecting device detecting a vibration state based on the preparatory operation start signal, a phototaking start device releasing a phototaking start signal instructing the start of a phototaking operation by a second manual operation, a vibration correcting optical system varying the phototaking optical axis according to the output of the vibration state detecting device, by driving at least a part of the phototaking optical system based on the phototaking start signal, and a control device allowing the entry only, during the function of the vibration state detecting device prior to the release of the phototaking start signal, of a cancellation signal indicating the cancellation of the first manual operation to the phototaking preparation start device or the phototaking start signal.

6 Claims, 8 Drawing Sheets

CAMERA WITH VIBRATION CORRECTING FUNCTION

BACKGROUND OF THE INVENTION

1. Field of the Invention

The present invention relates to control of a camera with vibration correcting function.

2. Related Background Art

There is already known a camera with a vibration correcting function, for correcting the vibration of the camera, e.g., via so-called hand shaking, by driving a part of the phototaking optical system so as to cancel the image movement. For detecting the image movement caused by vibration, there is provided a vibration (vibration state) detecting device, and such a detecting device has to be activated before the vibration correcting function is put into operation. However, in case the vibration state is detected by the vibration state detecting means such as an angular velocity sensor, an angular acceleration sensor or an acceleration sensor, there has not been paid particular consideration to the sequence of control in relation to other functions of the camera, such as the zooming operation, the flash unit charging operation or the timing of start of exposure.

An operation involving a variation in the voltage of the power source, such as the zooming operation, if conducted in the course of detecting vibration, will affect the precision of the detection by the sensor, and a deterioration in the precision of detection will undesirably affect the precision of the correction of vibration.

SUMMARY OF THE INVENTION

In consideration of the foregoing, an object of the present invention is to prevent deterioration of the precision of detection of vibration, in the course of detection of the vibration state.

The above-mentioned object can be attained, according to the present invention, by a camera with a vibration correcting function comprising a phototaking preparation start device for releasing a preparatory operation start signal for instructing the start of a phototaking preparatory operation by a first manual operation; a vibration state detecting device for starting the detection of the vibration state based on said preparatory operation start signal; a phototaking start device for releasing a phototaking start signal for instructing the start of the phototaking operation by a second manual operation; a vibration correcting optical system which drives at least a part of the phototaking optical system based on said phototaking start signal thereby varying the phototaking optical axis according to the output of said vibration state detecting device; and a control device which only allows, during the function of said vibration state detecting device prior to the release of said phototaking start signal, the cancellation of the first manual operation on said phototaking preparation start device or the entry of said phototaking start signal.

As mentioned above, the present invention inhibits any operation involving the variation in the power source voltage affecting the precision of detection in the course of detection of the vibration state, since, during the functioning of the vibration state detecting device prior to the release of the phototaking start signal, there is only enabled the entry of the cancellation of the first manual operation on the phototaking preparation start device or of the output of said phototaking start signal.

DESCRIPTION OF THE PREFERRED EMBODIMENTS

Figure 1:
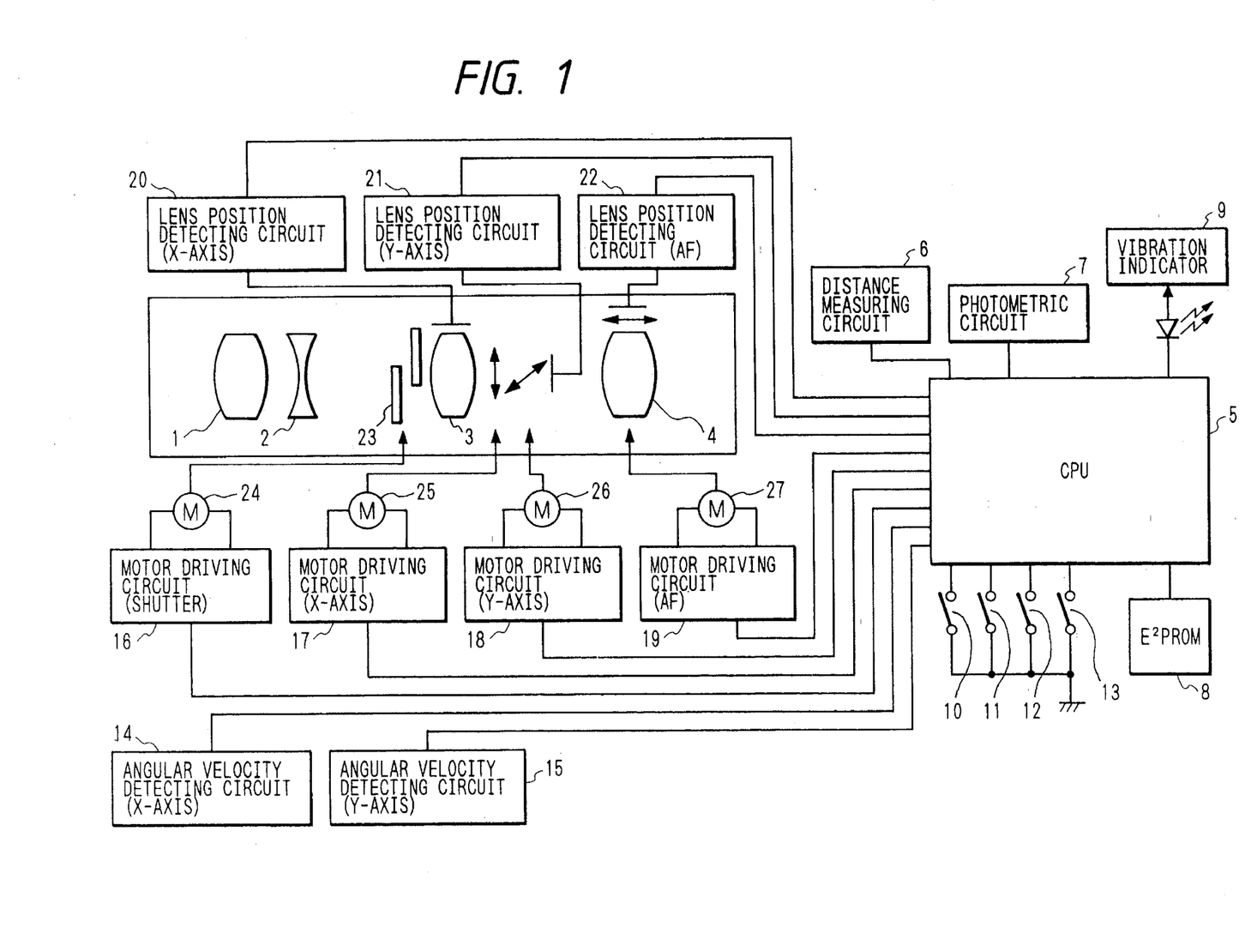
FIG. 1 is a circuit diagram of a first preferred embodiment of the present invention.

FIG. 1 is a circuit diagram of a first preferred embodiment of the present invention, wherein a phototaking lens is composed of four lenses 1, 2, 3, 4, among which the lens 3 constitutes a vibration correcting lens (hereinafter called vibration correcting lens 3) drivable along the X (horizontal) direction and Y (vertical) direction in a plane substantially perpendicular to the optical axis, for correcting the vibration.

A CPU 5, composed of a one-chip microcomputer, controls the entire sequence of camera, operations and is provided with a counter function, a timer function for time measurement, an A/D converting function etc. To said CPU 5 there are connected a distance measuring circuit 6, a photometry circuit 7, a non-volatile memory 8 capable of writing and reading (hereinafter called $E^2$PROM 8), a vibration state indicator 9 for indicating the state of vibration, a main switch 10 for starting the function of the camera, a half-stroke switch 11 to be turned on by a half-stroke depression of a shutter release button, a release switch 12 to be turned on by a full-stroke depression of the shutter release button, and a mode switch 13 for switching the phototaking modes. The main switch 10 has an on-position and an off-position, and, once set at the on-position by the user, it retains said on-position until it is returned to the off-position.

To said CPU 5, there are also connected an angular velocity detecting circuit 14 for detecting the amount of vibration of the camera in the X-direction, by the angular velocity based on a predetermined central position, an angular velocity detecting circuit 15 for similarly detecting the vibration in the Y-direction by the angular velocity, motor driving circuits 16, 17, 18, 19 and lens position detecting circuits 20, 21, 22.

The motor driving circuit 16 is connected to a motor 24 for opening and closing a shutter 23 for exposure. The motor driving circuit 17 is connected to a motor 25 for driving the vibration correcting lens 3 in the X-direction. The motor driving circuit 18 is connected to a motor 26 for driving the vibration correcting lens 3 in the Y-direction. The motor driving circuit 19 is connected to a motor 27 for axially driving a focusing lens 3, in order to bring the phototaking lens to an in-focus state.

The lens position detecting circuit 20 detects the position of the vibration correcting lens 3 in the X-direction, or the amount of movement thereof from a reference position such as the optical axis. The lens position detecting circuit 21 detects the position of the vibration correcting lens 3 in the Y-direction, or the amount of movement thereof from a reference position such as the optical axis. The lens position detecting circuit 22 detects the position of the focusing lens 4 or the amount of movement thereof from a reference position.

The angular velocity detecting circuits 14, 15, corresponding to the aforementioned vibration sensor circuit, vary the outputs according to the angular velocity generated by the camera vibration. The CPU 5 detects the angular velocity of the vibration by A/D conversion of said outputs. The angular velocity detecting circuits 14, 15 respectively detect the angular velocities in the X- and Y-directions.

The motor driving circuits 17, 18 effect duty drive of the motors 25, 26 for driving the vibration correcting lens 3. The CPU 5 indicates the driving direction by a drive direction signal, and the driving speed by a drive duty signal, to each motor driving circuit. According to these signals, the motor driving circuits 17, 18 power the motors 25, 26 with the indicated directions and duties, thereby controlling the vibration correcting lens 3 with an arbitrary speed.

The distance data obtained in the distance measuring circuit 6 are processed in the CPU 5, and the motor driving circuit 19 powers the motor 27 in the indicated direction according to the result of said processing, thereby controlling the focusing lens 4 with an arbitrary speed.

The rotation of the motor 25 is converted, by an X-direction lens driving mechanism (not shown), into a linear movement in the X-direction, thereby driving the vibration correcting lens 3 in the X-direction. Also the rotation of the motor 26 is converted, by a Y-direction lens driving mechanism (not shown), into a linear movement in the Y-direction, thereby driving the vibration correcting lens 3 in the Y-direction. The rotation of the motor 27 is converted, by a focusing lens driving mechanism (not shown), into a linear movement, thereby axially driving the focusing lens 4.

The lens position detecting circuit 20 releases pulses of a number corresponding to the moving amount of the vibration correcting lens 3 in the X-direction. Also the lens position detecting circuit 21 releases pulses of a number corresponding to the moving amount of the vibration correcting lens 3 in the Y-direction. The CPU 5 fetches the position and the moving amount in the X- and Y-directions by counting the number of these pulses, and calculates the moving speeds in the X- and Y-directions from the moving amounts in a predetermined time.

The lens position detecting circuit 22 releases pulses of a number corresponding to the axial moving amount of the focusing lens 4, and the CPU 5 fetches the position and the moving amount of the focusing lens 4 in the axial direction, by counting said pulses.

The E²PROM 8 is a non-volatile memory storing in advance, predetermined data required for the phototaking process, and the CPU 5 reads said data, when necessary in the execution of the predetermined sequence.

Figure 2:
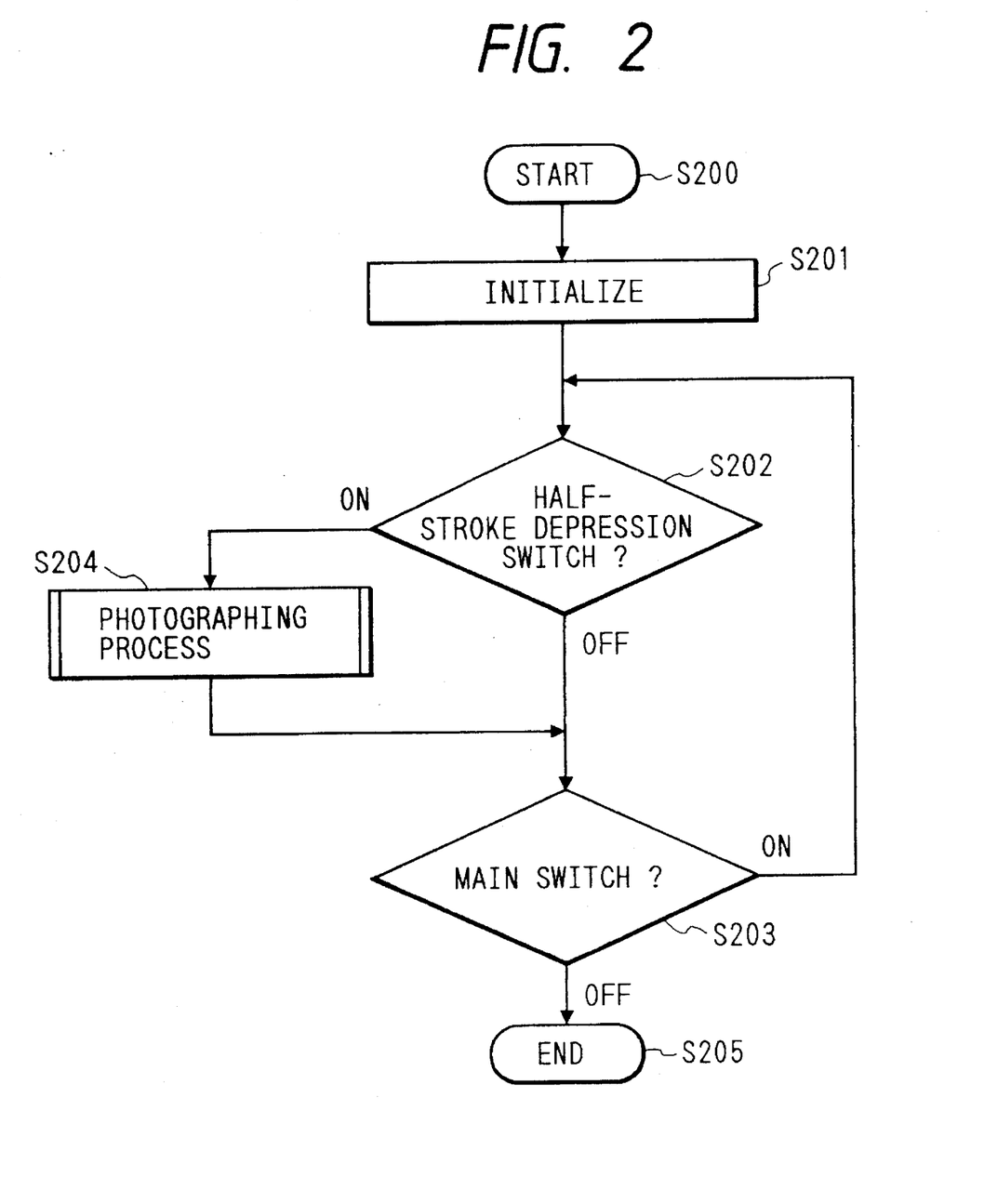
FIG. 2 is a main flow chart of a preferred embodiment of the present invention.

FIG. 2 is a flow chart showing the main sequence of a preferred embodiment of the present invention, and the sequence starts from a step S200 when the power source battery is loaded and the main switch 10 is turned on. The sequence will be explained as follows, according to the steps shown in the flow chart.

At first a step S201 initializes the interior of the CPU 5, and starts the charging of the capacitor of the strobe flash unit. Then steps S202 and S203 are repeated until the step S202 identifies the closing of the half-stroke switch 11 or the step S203 identifies the opening of the main switch 10. If the step S203 identifies that the main switch 10 has been turned off, the sequence proceeds to a step S205 to terminate the sequence. Then processing awaits for the turning-on of the main switch 10 again, and, when the main switch 10 is turned on, the sequence starts again from step S200. If the step S202 identifies that the half-stroke switch 11 has been turned on, sequence proceeds to a step S204 to effect the phototaking process.

Figure 3:
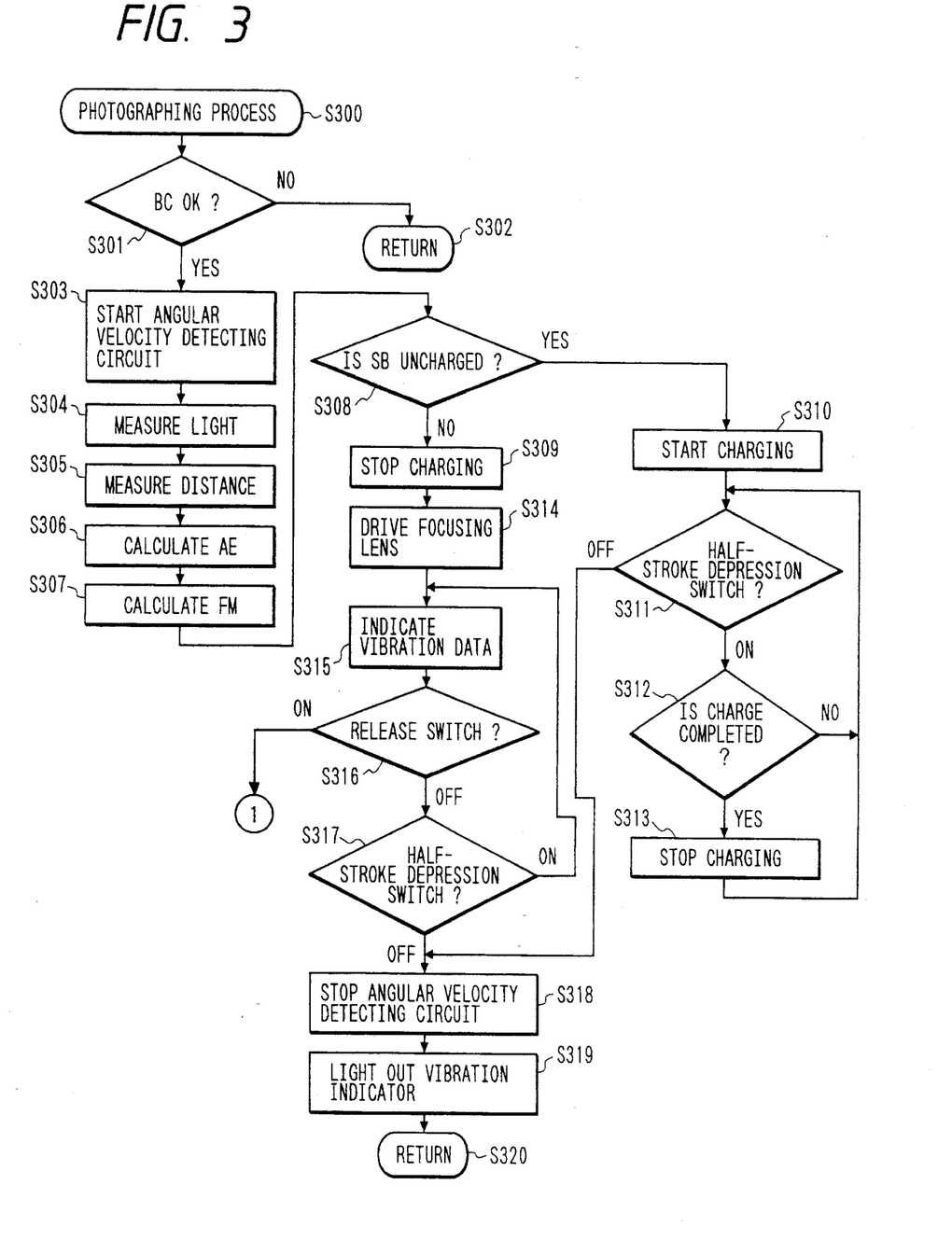
FIGS. 3 and 4 are subroutine flow charts showing the phototaking process of the first embodiment.
Figure 4:
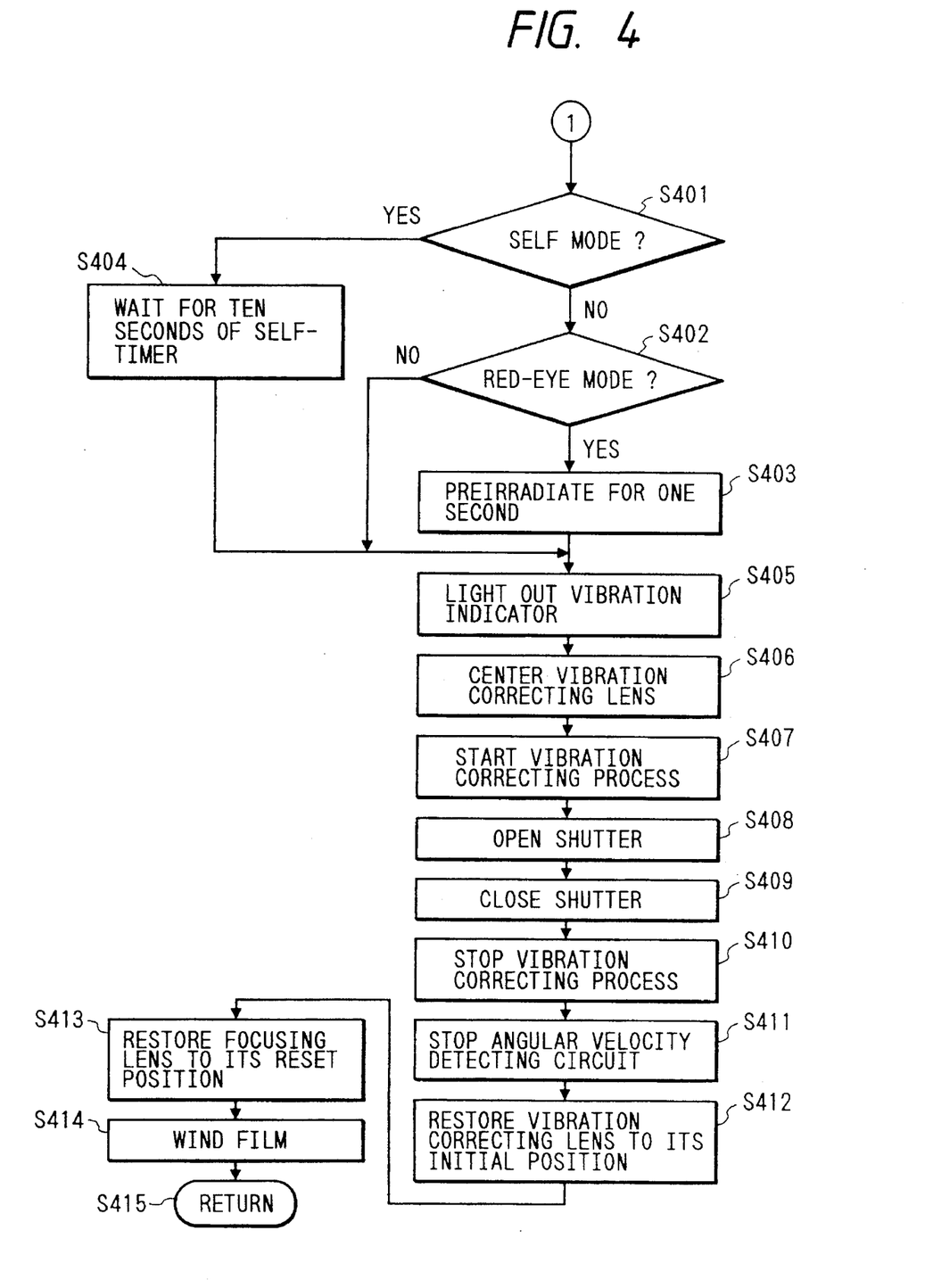

FIGS. 3 and 4 are subroutine flow charts showing the phototaking process in the step S204 in FIG. 2.

When the half-stroke switch 11 is turned on, the sequence starts from a step S300 in FIG. 3. At first a step S301 discriminates whether the battery has a sufficient voltage for the phototaking process, and, if the voltage is insufficient for the phototaking process, the sequence returns, from a step S302, to the flow in FIG. 2. In this case the phototaking process is not executed. If step S301 identifies that the voltage is enough for the phototaking process, a step S303 activates the angular velocity detecting circuits 14, 15, then a step S304 executes the photometry process, and a step S305 executes the distance measurement.

Then a step S306 processes the result of photometry in step S304, and a step S307 executes, utilizing the result of distance measurement in S305, discrimination for whether the strobe flash is utilized and so-called flashmatic calculation for determining the timing of flash emission in case the strobe flash is utilized.

Then a step S308 discriminates whether the capacitor of the strobe flash unit has been completed, and, if completed, a step S309 terminates the charging and the sequence proceeds to a step S314, but, if uncompleted, the sequence proceeds to a step S310, which starts the charging again if it has been stopped, or continues the charging. Then, if a step S311 identifies that the half-stroke switch 11 is off, the sequence proceeds to a step S318, but, if step S311 identifies that the half-stroke switch 11 is on, a step S312 again discriminates whether the capacitor for the strobe flash unit has been charged. If the charging is completed a step S313 terminates the charging and the sequence returns to the step S311, but, if not completed, the sequence returns to the step S311 to repeat the steps S311 and S312.

A step S314 drives the focusing lens 4 to a predetermined position, according to the distance data obtained by processing the distance measured in the step S305.

A step S315 effects indication on the vibration state indicator 9, based on the data of the angular velocity detecting circuits 14, 15 activated in step S303. A step S316 checks the state of the release switch 12, and, if it is off, the sequence proceeds to a step S317. If the step S317 identifies that the half-stroke switch 11 is on, the sequence returns to the step S315 to repeat the steps S315, S316 and S317.

If the step S317 identifies that the half-stroke switch 11 is off, a step S318 terminates the angular velocity detecting circuits 14, 15, then a step S319 turns off the indication and the sequence returns from a step S320 to the flow shown in FIG. 2. In this case the phototaking process is not executed.

If the step S316 identifies that the release switch 12 is on, the sequence proceeds to a step S401 shown in FIG. 4.

The step S401 discriminates whether the selftimer mode for self-timer phototaking process has been selected, and, if selected, a step S404 waits for the time of the self-timer (for example 10 seconds), and the sequence then proceeds to a step S405.

In case of negative discrimination in step S401, a next step S402 discriminates whether the red-eye mode has been selected, and, if not, the sequence proceeds to a step S405, but, if selected, a step S403 effects pre-irradiation for 1 second before the phototaking process in order to avoid the red-eye phenomenon, and the sequence then proceeds to the step S405.

Step S405 turns off the indication of the vibration states, indicator 9 activated in the step S309. A next step S406 moves the center of the vibration correcting lens 3 from the initial reset position to the optical axis center position, and a next step S407 starts the vibration correcting process. Then a next step S408 starts to open the shutter 23. The vibration correcting process continues from step S407 prior to the opening of the shutter 23 to a step S410 immediately after the completion of closing of the shutter 23. Step S408 opens the shutter with a predetermined time, corresponding to the exposure value according to the exposure calculation in the step S306. Then the step S409 closes the shutter, and the step S410 terminates the vibration correcting process. A next step S411 stops the angular velocity detecting circuits 14, 15, then a step S412 returns the vibration correcting lens 3 to the initial position, and a step S413 drives the focusing lens 4 to a predetermined reset position. Subsequently a step S414 effects film feeding process, and the sequence returns from a step S415 to the flow shown in FIG. 2.

In the foregoing embodiment, angular velocity sensors are employed as the vibration state detecting devices and the outputs thereof are appropriately processed in the circuits, but there may naturally be employed angular acceleration sensors or acceleration sensors for this purpose.

Also the vibration correcting optical system is composed of a correcting lens drivable in a plane (defined by X- and Y-axes) perpendicular to the phototaking optical axis, but there may also be employed other mechanisms capable of varying the phototaking optical axis, such as a prism.

A second preferred embodiment of the present invention will be explained as follows.

Figure 5:
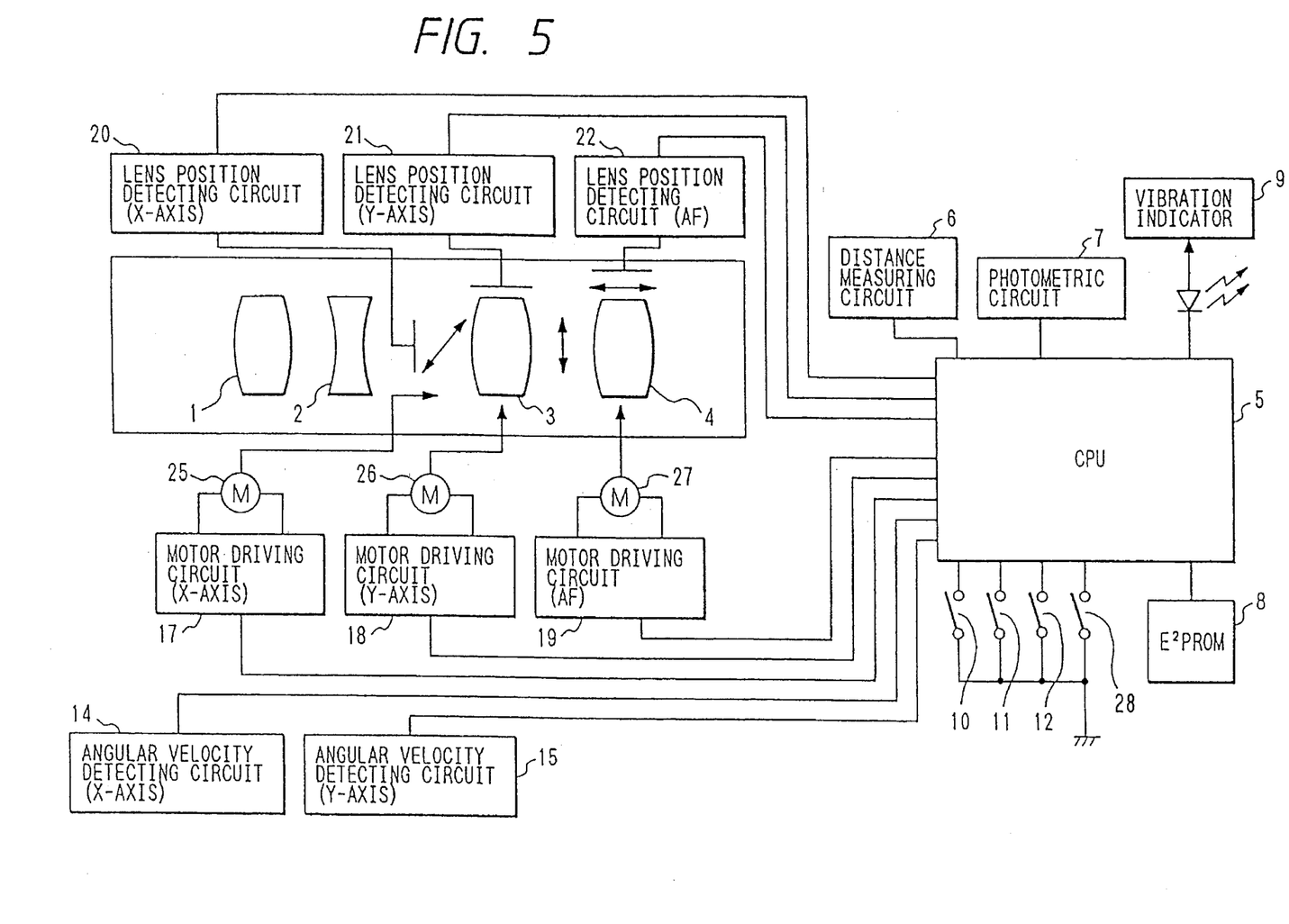
FIG. 5 is a circuit diagram of a second preferred embodiment of the present invention.

FIG. 5 is a circuit diagram of a second embodiment of the present invention, wherein components equivalent to those in the first embodiment are represented by the same numbers and are omitted from the following description.

To the CPU 5 there is connected a vibration correcting control inhibition switch 28, for inhibiting the vibration correcting control, adapted operation by the photographer.

In the present embodiment, the distance measurement execution time of the distance measuring circuit 6 is assumed to be 0–300 ms, the photometry execution time of the photometry circuit 6 as 50 ms, the driving time of the focusing lens 4 as 100 ms, the circuit stabilization time of the angular velocity detecting circuits 14, 15 as 300 ms, the shock avoiding time at the shutter release as 50 ms, the detection time for zero angular velocity as 900 ms, and the start-up control time for stabilization of the vibration correcting control as 20 ms.

Figure 6:
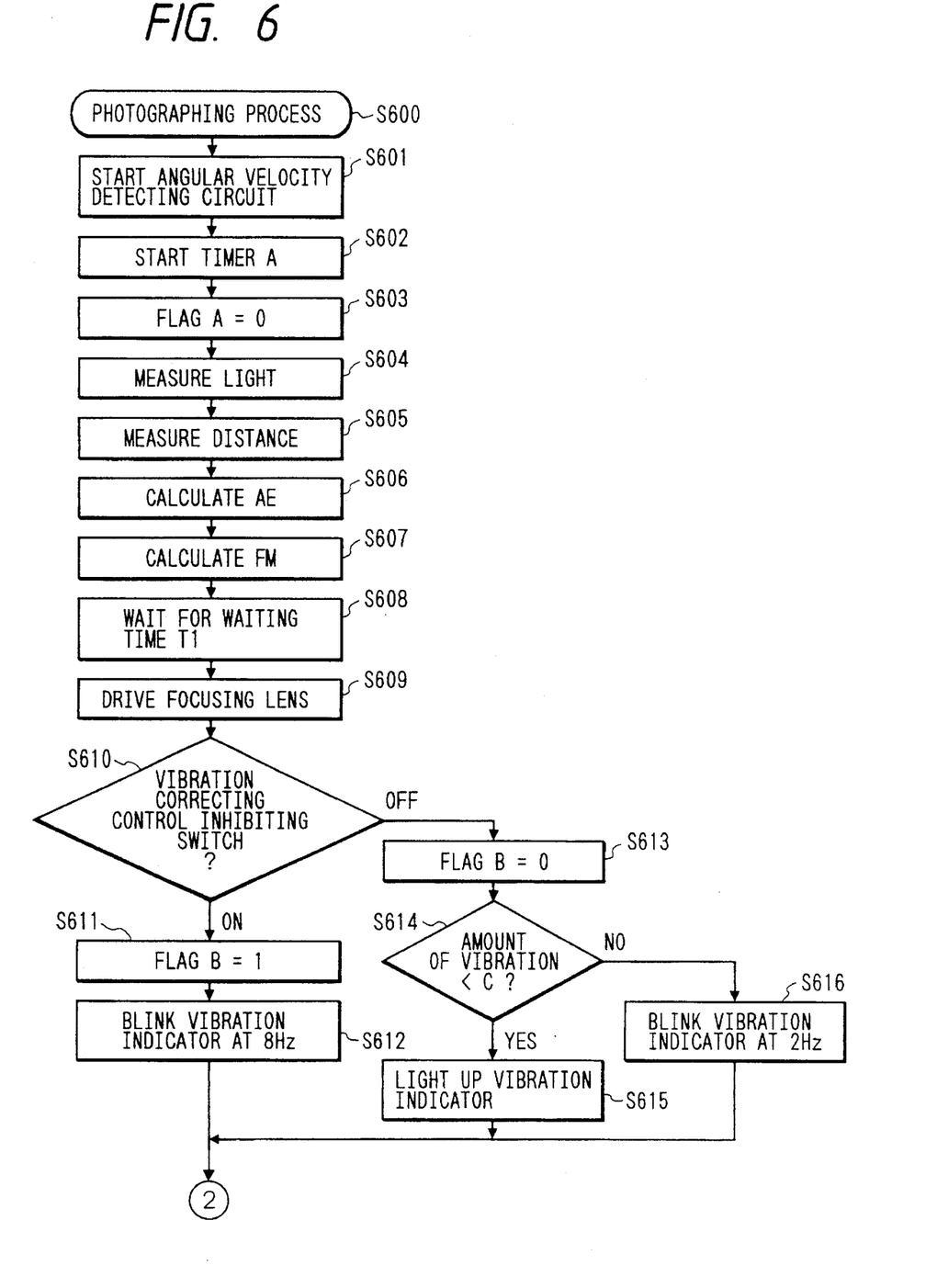
FIGS. 6 to 8 are subroutine flow charts showing the phototaking process of the second embodiment.
Figure 7:
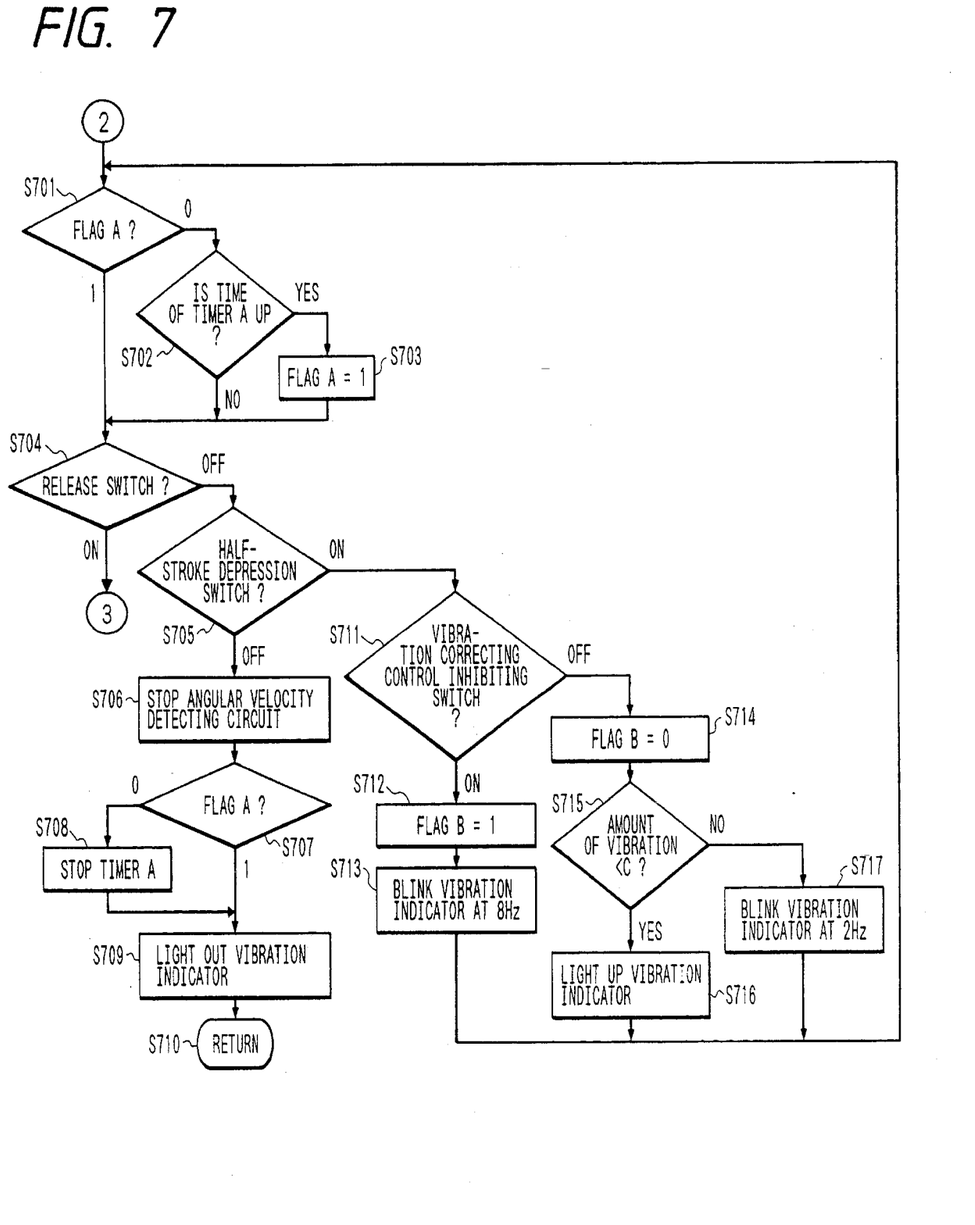
Figure 8:
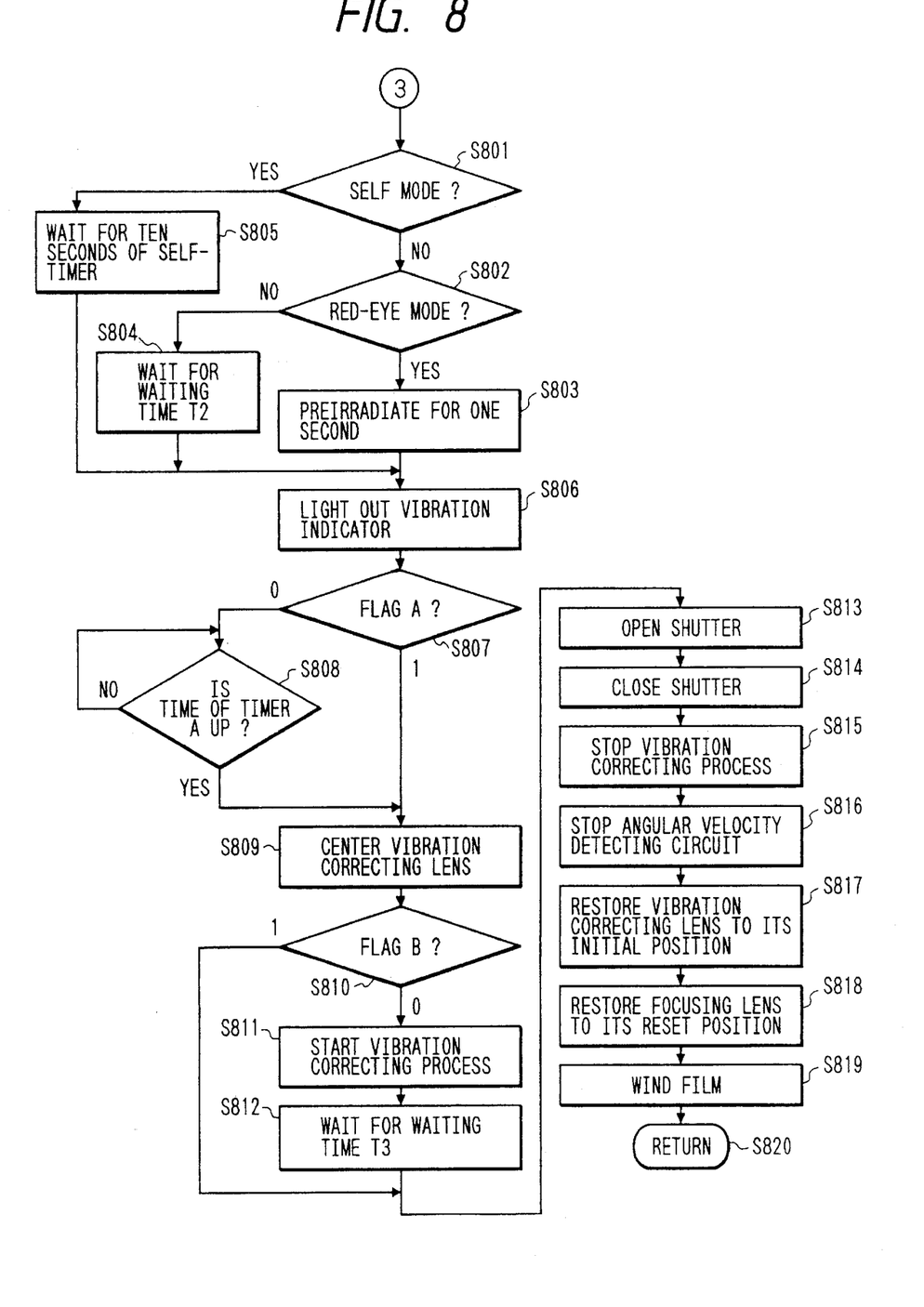

FIGS. 6, 7 and 8 are subroutine flow charts showing the phototaking process of the second embodiment, of which the main flow chart is the same as that shown in FIG. 2.

The sequence starts from a step S600 in FIG. 6 when the closing of the half-stroke switch 11 is confirmed. At first a step S601 activates the angular velocity detecting circuits 14, 15, which continue functioning until deactivation in a step S816 (as shown in FIG. 8).

A next step S602 starts a timer-A (corresponding to the detection time for zero angular velocity, which is 900 ms in this embodiment), then a step S603 sets a flag-A at 0, then a step S604 executes the photometry process and a step S605 executes the distance measuring process.

Then a step S606 executes an exposure calculation based on the result of photometry in the step S604, and a step S607 executes a calculation on the use of the strobe flash unit utilizing the result of distance measurement in the step S605. A next step S608 waits for a time T1, and the sequence proceeds to a step S609. Said waiting time T1 is required for securing the stabilization of the angular velocity detecting circuits. In the present embodiment said waiting time is selected as 250 ms, because the subtraction of the distance measuring time of 0–300 ms and the photometry time of 50 from the stabilization time of the angular velocity detecting circuits of 300 ms provides 0–250 ms. A step S609 drives the focusing lens 4 to a predetermined position, according to the distance set in the step S605.

A next step S610 discriminates whether the vibration correcting control inhibition switch 28 is on, and, if on, a step S611 sets a flag-B at 1, then a step S612 turns on an intermittent indication of 8 Hz on the vibration state indicator 9 and the sequence proceeds to a step S701 in FIG. 7. Said intermittent indication of 8 Hz means that the vibration correcting control is not executed.

If the step S610 identifies that the vibration correcting control inhibition switch 28 is off, a next step S613 sets the flag-B at 0, and a step S614 discriminates whether the outputs from the angular velocity detecting circuits 14, 15, namely the vibration amount, is smaller than a predetermined value C. If smaller, a step S615 turns on the indication on the vibration state indicator 9 and the sequence proceeds to a step S701 in FIG. 7. Such turned-on indication on the vibration state indicator 9 means that the detected vibration amount is within a correctable rankle.

If the step S614 identifies that the vibration amount is larger than the predetermined value C, a step S616 turns on an intermittent indication of 2 Hz on the vibration state indicator 9 and the sequence proceeds to the step S701 in FIG. 7. The intermittent indicator of 2 Hz means that the detected vibration amount is so large that sufficient correction of vibration is not securely achievable.

The step S701 in FIG. 7 discriminates the state of the flag-A set in the step S603, and, if it is 0, the sequence proceeds to a step S702, but, if 1, the sequence proceeds to a step S704. If the step S702 identifies the expiration of the timer-A (expiration of the detection time for zero angular velocity, which is 900 ms in the present embodiment), a step S703 sets the flag-A at 1 and sequence proceeds to a step S704.

Step S704 discriminates the state of the release switch 12, and, if it is on, the sequence proceeds to a step S801 in FIG. 8, but, if off, a next step S705 discriminates the state of the half-stroke switch 11. If it is off, a step S706 deactivates the angular velocity detecting circuits 14, 15. Then a step S707 discriminates the state of the flag A, and, if it is 1, the sequence proceeds to a step S709, but, if 0, a step S708 stops the timer-A and the sequence proceeds to the step S709. Step S709 turns off the indication of the vibration state indicator 9, and the sequence returns, from a step S710, to the main flow in FIG. 2. In this case the phototaking process is not executed.

If the step S705 identifies that the half-stroke switch 11 is on, a next step S711 discriminates the state of the vibration correcting control inhibition switch 28, and, if it is on, a step S712 again sets the flag-B at 1, then a step S713 effects an intermittent indication of 8 Hz on the vibration state indicator 9 and the sequence returns to the step S701.

If the step S711 identifies that the vibration correcting control inhibition switch 28 is off, a step S714 again sets the flag-B at 0, and a next step S715 discriminates whether the outputs of the angular velocity detecting circuits 14, 15, namely the vibration amount, is larger than the predetermined value C. If the step S715 identifies that the vibration amount is smaller than the predetermined value C, a step S716 turns on an indication on the vibration state indicator 9 and the sequence returns to the step S701.

If the step S715 identifies that the vibration amount is larger than the predetermined value C, a step S717 turns on an intermittent indication of 2 Hz on the vibration state indicator 9, and the sequence returns to the step S701.

Step S801 in FIG. 8 discriminates whether the self-timer mode has been selected, and, if selected, a step S805 waits for the time of the self-timer (for example 10 seconds) and the sequence proceeds to a step S806. In case of no selection in the step S801, a next step S802 discriminates whether the red-eye mode has been selected, and, if Selected, a step S803 effects pre-irradiation for 1 second, and the sequence proceeds to a step S806. In case of no selection in the step S802, a step S804 waits for a waiting time T2 (shock avoiding time at the shutter release; 50 ms in this embodiment), and the sequence proceeds to the step S806.

The step S806 turns off the indication of the vibration state indicator, activated in the step S612, S615, S616, S713, S716 or S717.

A next step S807 discriminates the state of the flag-A, and, if it is 1, the sequence proceeds to a step S809, but, if 0, a step S808 awaits the expiration of the timer-A started in the step S602, and the sequence then proceeds to the step S809. Step S809 moves the center of the vibration correcting lens 3 from the initial reset position to the optical axis center position. A next step S810 discriminates the state of the flag-B, and if it is 1, the vibration correcting control inhibition mode is identified and the sequence proceeds to a step S813 without the movement of the vibration correcting lens 3.

If the step S810 identifies that the flag-B is 0, there is identified the mode for effecting the vibration correcting control, and a next step S811 starts the vibration correcting process. After said start, a step S812 waits for a waiting time T3 (start-up control time for stabilizing the vibration correcting control; 20 ms in this embodiment), and the sequence proceeds to a step S813.

The step S813 starts to open the shutter. The vibration correcting control started in the step S811 before the start of opening of the shutter, continues to a step S815 immediately after the completion of closing of the shutter. A step S813 opens the shutter for a predetermined time corresponding to the exposure value according to the exposure calculation in the step S606. Then a step S814 executes closing of the shutter, and a step S815 terminates the vibration correcting process. A step S816 deactivates the angular velocity detecting circuits 14, 15, then a step S817 returns the vibration correcting lens 3 to the initial position, and a step S818 drives the focusing lens 4 to a predetermined reset position. Then a step S819 effects film feeding process, and the sequence returns, from a step S820, to the main flow in FIG. 2.

The half-stroke switch for the preparation for the start of phototaking process may be replaced, for example, by a touch sensor for detecting the contact of a part of the body of the photographer, a proximity sensor for detecting the approach of the photographer to the camera, or a sensor for detecting the line of sight of the photographer.

The angular velocity detecting circuits 14, 15, activated in the step S601, continue to be active until they are deactivated in the step S816. Thus the angular velocity detecting circuits 14, 15 remain active even during the inhibition of the vibration correcting control. Consequently the angular velocity detecting circuits 14, 15 do not require the circuit stabilization time every time, and can effect the correction of vibration immediately, without waiting for such circuit stabilization time even after the correction of vibration is once inhibited.

The second embodiment of the present invention shows an example of accepting the entry by employing the use of a vibration inhibition switch during the functioning of the angular velocity detecting circuits, but there may instead be employed a switch for varying the sensitivity level of the angular velocity sensors or a switch for varying the process level of the output from the angular velocity sensors in the angular velocity detecting circuit.

The foregoing first and second embodiments have been explained with a camera with a lens shutter, but the present invention is likewise applicable to a single-lens reflex camera or a video camera for taking a moving picture.

In the present invention, as explained in the foregoing, during the functioning of the vibration state detecting device prior to the release of the phototaking start signal, for example by a manual switch operation, there is only allowed the entry of the cancellation of the first manual operation to the phototaking preparation start device (for example cancellation of the operation of the half-stroke switch), or the output of said phototaking start signal (for example generated by the manual operation of the shutter release switch). Consequently, during the detection of the vibration state, there is inhibited any operation involving the variation of the power supply voltage, such as the zooming operation, affecting the precision of detection by the detecting device. Consequently the precision of the correction of vibration cannot be affected even if the photographer erroneously actuates an operation switch for example for zooming operation.

What is claimed is:

1. A camera with a vibration correcting function, comprising:

a phototaking preparation start device for releasing a preparatory operation start signal for instructing the start of a phototaking preparatory operation by a first manual operation;

a vibration state detecting device detecting a vibration state based on said preparatory operation start signal;

a phototaking start device releasing a phototaking start signal instructing the start of a phototaking process by a second manual operation;

a vibration correcting optical system varying the phototaking optical axis, according to the output of said vibration state detecting device, by driving at least a part of the phototaking optical system based on said phototaking start signal; and a control device allowing the entry only of a cancellation signal indicating cancellation of the first manual operation to said phototaking preparation start device, or said phototaking start signal, during the function of said vibration state detecting device prior to the release of said phototaking start signal.

2. A camera according to claim 1, wherein said control device is adapted to terminate the detection of vibration state by said vibration state detecting device, in response to said cancellation signal.

3. A camera according to claim 1, wherein said control device is adapted to start the function of said vibration correcting optical system and the phototaking operation in response to said phototaking start signal.

4. A camera according to claim 1, further comprising:

a flash preparation device for preparing for the emission of auxiliary phototaking flash;

wherein said control device includes a flash emission preparation discriminating device for discriminating, after reception of said preparatory operation start signal, whether said flash preparation device has completed the preparation for flash emission.

5. A camera with a vibration correcting function, comprising:

a vibration correcting device correcting vibrations applied to the camera; and, a control device allowing the entry only of a signal for canceling preparatory phototaking or a signal for starting phototaking, during the detection of vibration prior to phototaking.

6. A method of phototaking comprising the steps of:

starting preparatory phototaking;

detecting vibration;

allowing the entry only of a signal for canceling preparatory phototaking or a signal for starting phototaking; and, phototaking with vibration correction based on said vibration detection.

* * * * *